United States Patent [19]
Gardner et al.

[11] 3,808,784
[45] May 7, 1974

[54] REVERSE LOCKOUT

[75] Inventors: Frank H. Gardner, Grundy Center, Iowa; Norman G. Stroup, Orion; Eugene J. Krukow, Cordova, both of Ill.

[73] Assignee: International Harvester Company, Chicago, Ill.

[22] Filed: Mar. 16, 1973

[21] Appl. No.: 342,125

[52] U.S. Cl. ............................................ 56/208
[51] Int. Cl. ........................................... A01d 67/00
[58] Field of Search ......... 56/10.2, 10.4, 10.8, 11.2, 56/208, DIG. 15

[56] References Cited
UNITED STATES PATENTS

| | | | |
|---|---|---|---|
| 3,609,947 | 10/1971 | Herbsthofer | 56/DIG. 15 |
| 3,659,618 | 5/1972 | Kobald | 56/DIG. 15 |
| 3,698,164 | 10/1972 | Boone et al. | 56/10.4 |

Primary Examiner—Louis G. Mancene
Assistant Examiner—J. A. Oliff
Attorney, Agent, or Firm—F. David AuBuchon; Floyd B. Harman

[57] ABSTRACT

A reverse drive lockout mechanism for a combine harvester having a crop-gathering platform which is provided with ground-engaging control fingers, the lockout mechanism preventing the harvester from inadvertently being driven in reverse when such control fingers are in ground proximity. A normally de-energized solenoid, mounted on the speed lever console, maintains its plunger projected and in the path of movement of the speed lever, thus preventing entry of the lever into the reverse speed range. A switch assembly becomes effective when the platform is raised a predetermined distance from the ground to establish an electrical circuit through the solenoid winding, thus retracting the plunger and allowing the speed lever to be moved in the reverse speed range.

10 Claims, 5 Drawing Figures

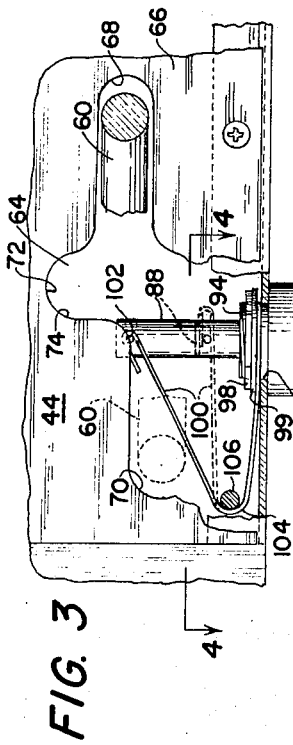
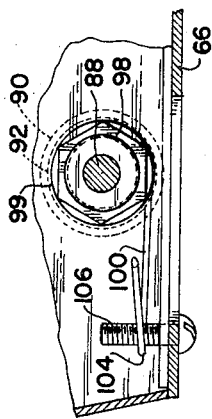
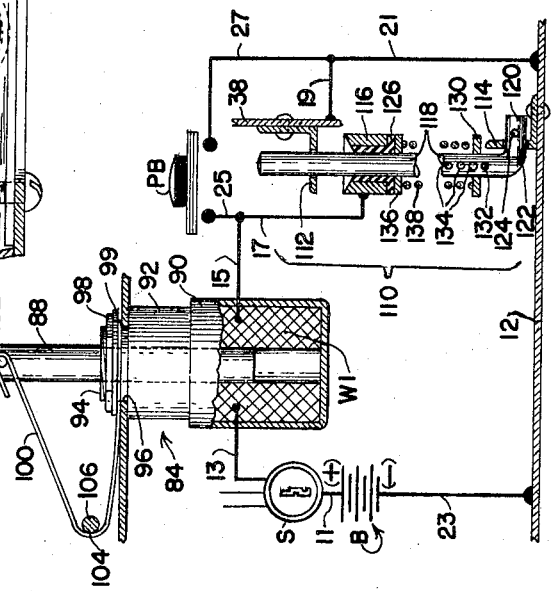
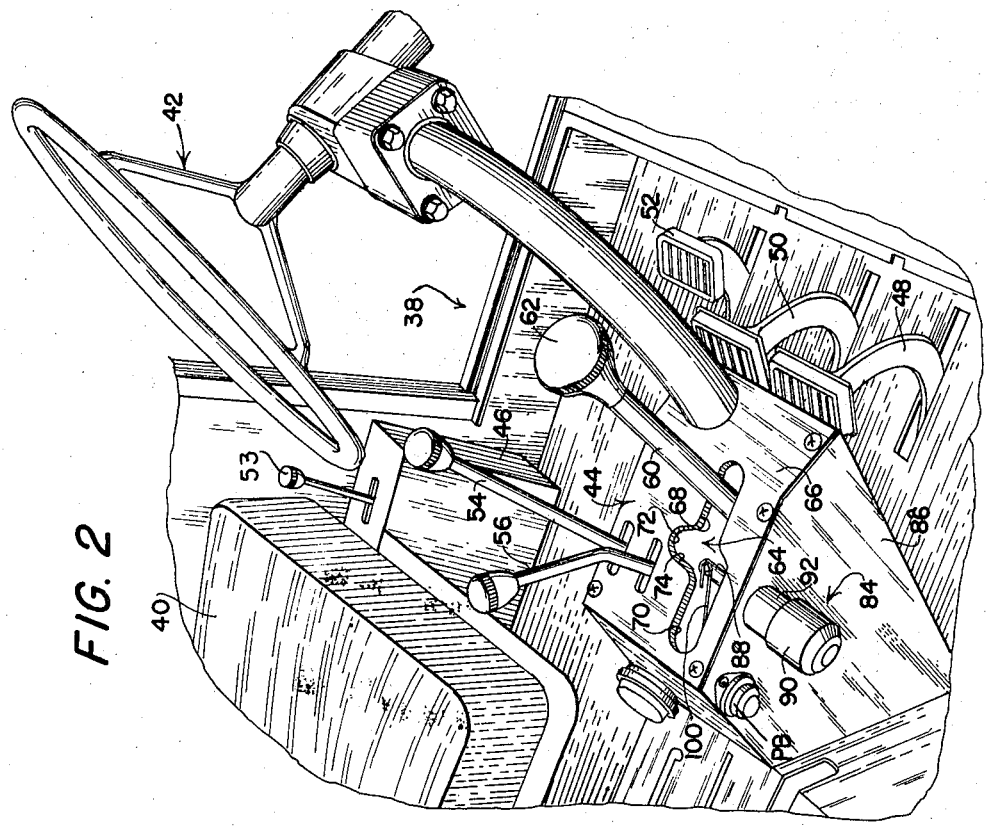

REVERSE LOCKOUT

The present invention relates generally to harvesting machines of the type which is commonly referred to as a combine harvester and has particular reference to a reverse drive lockout mechanism by means of which an operator is prevented from driving the machine in reverse under certain conditions which are unfavorable to rearward travel of the machine.

In a combine harvester of the general type under consideration, the crop is gathered and fed into the machine for threshing and other processing operations by means of a tubular header and platform assembly which is mounted at the forward end of the harvester chassis or framework for swinging movement about a horizontal axis between a lower inclined operative ground scanning position where forward movement of the harvester causes the crop to progressively enter the forward open end of the header, and a raised inoperative position where the forward open end of the header is widely removed from ground level. Swinging movement of the header is effected under the control of a hydraulic lift cylinder.

It has recently been the practice in connection with such combine harvesters to provide automatic means for maintaining the forward end of the hearder at an optimum small crop-gathering distance above the surface of the ground, one such means embodying a series of sensing fingers or feelers which are carried on a transverse rock shaft with their lower portions resting upon the ground so that as the harvester travels forwardly these fingers are dragged or pulled, so to speak, over the surface of the ground, thus imparting varying increments of rocking movement to the rock shaft. The amplitude and direction of such rocking movements are utilized to actuate a hydraulic valve in such a manner that fluid is variously supplied to the hydraulic lift cylinder, either to raise or lower the header and thus maintain the same at a substantially constant ground-sensing distance above the level of the ground. During the operation of such a combine harvester, conditions will invariably arise where it is deemed necessary for the operator to drive the harvester in reverse. When such a condition arises, the operator will ordinarily cause the header to become elevated an appreciable distance above ground level before he moves the speed control lever into its reverse range of movement. Otherwise the resultant reverse travel of the harvester might rupture or otherwise damage the sensing fingers which, because of their rearward and downward inclination, are likely to bind against or dig into the ground. If relatively high reverse speeds are resorted to, serious damage to the fingers, their supporting rack shaft, or other internal header equipment may result.

According to the present invention, inadvertent reverse movement of the harvester is precluded by the provision of a reverse drive lockout mechanism by means of which the operator is prevented from moving the speed lever into its reverse range at such time as the header is in its lowered operative ground-sensing position, such mechanism automatically becoming disabled when the header is raised and the sensing fingers consequently have moved away from the ground so that the operator may then operate the harvester in reverse with impunity. The provision of such a reverse drive lockout mechanism, and possessing the stated advantages, constitutes the principal object of the present invention.

In carrying out this object, the invention contemplates the provision of a lockout solenoid which may conveniently be mounted on the speed lever console of the operator's cab and which is provided with a plunger which is movable between a projected position wherein it is disposed in the path of movement of the speed lever and prevents the latter from entering its reverse speed range, and a retracted position wherein it is withdrawan from such path of movement. Electrical contact means, operable under the control of the raising and lowering movements of the header, is effective to energize and de-energize the solenoid so that when the header is in its down position, the plunger becomes projected and when the header is in its up position the plunger becomes retracted. By such an arrangement, any inadvertent attempt on the part of the operator to shift the speed lever into its reverse speed range will meet with obstruction by the projected plunger, thus alerting the operator to the fact that he has failed to raise the header. In the illustrated embodiment of the invention, the solenoid plunger is yieldingly biased toward its projected position, energization of the solenoid serving to retract the same. Thus, the aforementioned electrical contact means is effective when the header is in its raised or up position to complete the solenoid circuit and cause retraction of the plunger so that the operator may drive the harvester in either a forward or a reverse direction, and is effective when the header is in its down position to open the solenoid circuit and release the yieldingly biased plunger so that it will move to its lever-blocking position so that the operator may drive the harvester only in a forward direction. It is however, within the purview of the invention to reverse the circuit arrangement so that the plunger remains normally retracted when the header is in its up position and the electrical contact means becomes effective to project the plunger when the header moves to its down position.

The invention further contemplates the provision of an auxilliary control for the lockout solenoid whereby, if desired, the operator, by the simple expedient of depressing a push button on the speed lever console, may override the electrical contact means and cause energization of the solenoid to thus retract its associated plunger despite the fact that the header is in its down position. By such an arrangement the operator may, under special circumstances that will be set forth subsequently, disable the automatic contact means and effect controlled reverse movement of the harvester.

The provision of a reverse drive lockout mechanism which is extremely simple in its construction and which therefore may be manufactured at a low cost; one which is comprised largely of commercially available components which require a minimum of tooling or other operations, thereby further contributing to low cost; one which is possessed of a minimum number of parts, particularly moving parts, and which therefore is unlikely to get out of order; one which is rugged and durable and which therefore will withstand prolonged usage; one which may be constructed as original harvester equipment or, alternatively, may be readily installed on existing harvesters; one which, when operatively installed upon a harvester, is readily accessible for inspection of parts, replacement or repair thereof, as well as adjustment; and one which, otherwise, is well adapted to perform the services required of it, and further desirable features which have been borne in mind in the production and development of the present invention.

Other objects and advantages of the invention, not at this time enumerated, will readily suggest themselves as the nature of the invention is better understood.

In the accompanying two sheets of drawings forming a part of this specification, one illustrative embodiment of the invention has been shown.

In These Drawings:

FIG. 2 is a fragmentary inside perspective view of a portion of the operator's cab, the view being taken in the vicinity of the console which embodies the operator's ground speed control lever;

FIG. 3 is an enlarged fragmentary top plan view, partly in section, of a portion of the console of FIG. 2, and showing specifically the application thereto of a lockout solenoid which is employed in connection with the present invention;

FIG. 4 is a sectional view taken substantially on the line 4—4 of FIG. 3; and

FIG. 5 is an electrical circuit diagram of the reverse drive lockout mechanism.

Figure 1:
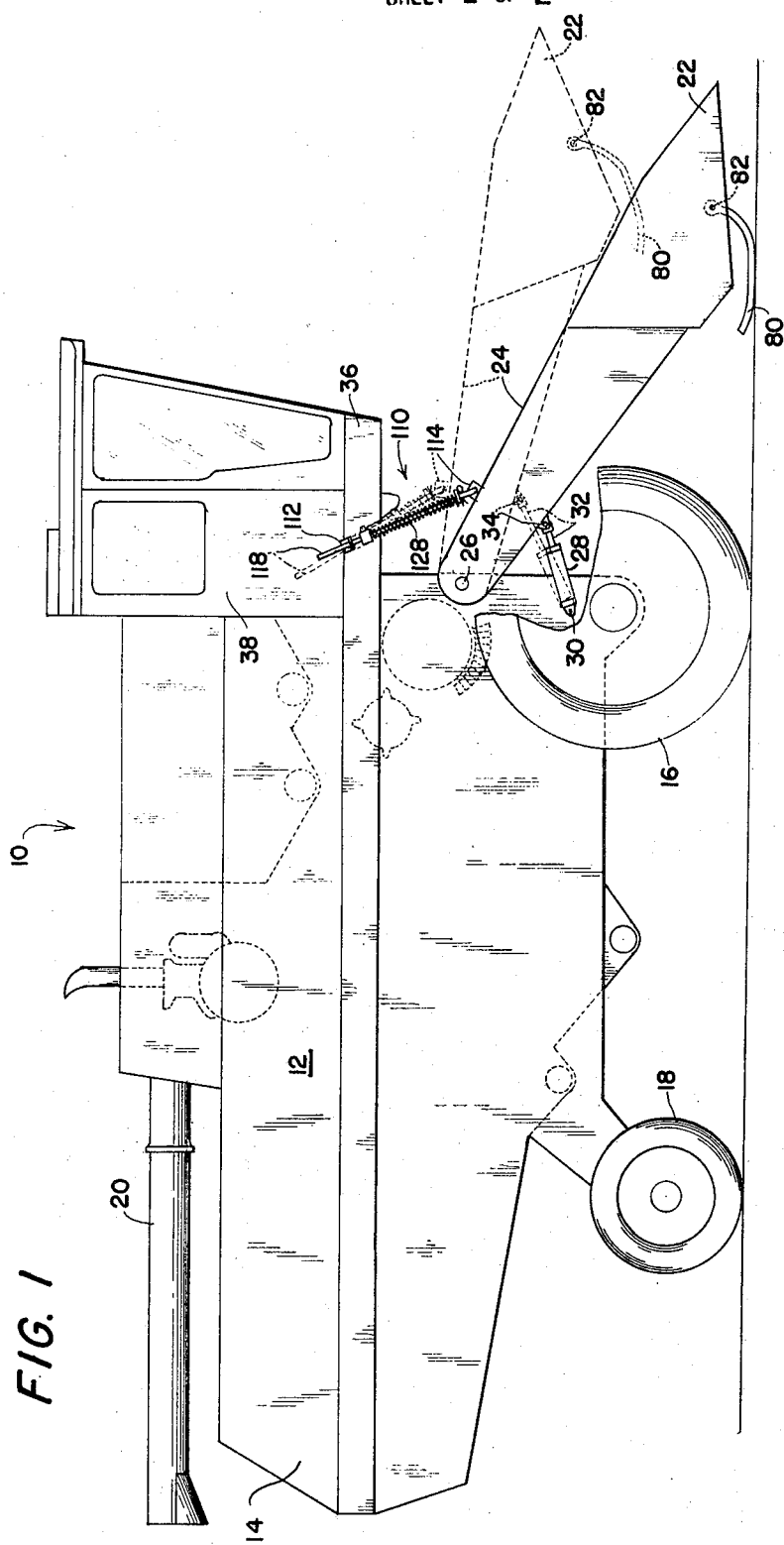
FIG. 1 is a side elevational view, largely schematic in its representation, of a combine harvester and showing the reverse drive lockout mechanism of the present invention operatively applied thereto.

Referring now to the drawings in detail and in particular to FIG. 1, a combine harvester embodying the novel reverse drive lockout mechanism of the present invention is designated in its entirety at 10, the harvester otherwise being of more or less conventional construction. The harvester involves in its general organization a chassis or body portion 12 having vertical side walls 14, the body portion being tractionally supported by drive wheels 16 and steerable wheels 18 and serving to enclose the usual grain threshing mechanism, separating mechanism, and other conventional crop-treating apparatus, the details of which have not been disclosed herein since they bear no direct relationship to the present invention. The harvester further includes the usual unloader or grain discharge tube 20 which is shown herein as being disposed in its inoperative or parked position.

The harvester is fed with unthreshed material which is collected by the crop supply platform 22. This material travels upwardly through the header 24 under the influence of an internal conveyor (not shown), the conveyor discharging its contents rearwardly into the threshing zone of the harvester where it is operated upon by the aforementioned crop treating apparatus. The threshed and cleaned grain can be discharged from the grain storage tank through the grain discharge tube 20 which is capable of being swung laterally to various selected discharge positions.

The header 24 is mounted on the harvester chassis or framework for swinging movement about a horizontal axis, which is established by a transverse pivot shaft 26, between the lower ground-sensing position in which it is shown in full lines in FIG. 1, and the raised inoperative or parked position in which it is shown in dotted lines. The header is movable under the control of a hydraulic cylinder 28 which is pivotally connected at one end by a pivot shaft 30 to the chassis 12 and which is provided with a thrust plunger 32, the outer end of which is connected by a pivot shaft 34 to a medial region of the header 24. It will be apparent that when the cylinder 28 is supplied with fluid under pressure, projection of the plunger 32 therefrom will serve to elevate the header 24 and its associated platform 22.

The supply of fluid to the hydraulic cylinder may be regulated either manually or by automatic means as will be set forth in greater detail presently.

The harvester 10 further includes an operator's platform 36 which constitutes the base support for an operator's cab 38 (see also FIG. 2) which encloses various convenience and control devices such as the operator's seat 40, steering facilities 42, consoles 44 and 46, brake pedals 48 and 50 for individual wheel braking, a pedal 52 which is commonly referred to as the "foot-n-inch" pedal and by means of which the combine harvester may be brought to a stop or, alternatively, caused to inch forward with small intermittent motion, together with various other control instrumentalities which bar no direct relation to the present invention.

The console 46 has associated therewith the usual unloader swing lever 53 by means of which the aforementioned grain discharge tube 20 may be swung to the desired unloading position. The console 44 bears a direct relation to the present invention and it embodies a header control lever 54 which, when pushed forwardly, causes fluid to be supplied to the cylinder 28 (FIG. 1) in such a manner as to project the plunger 32 and cause elevation of the header 24 as previously described, and when pulled rearwardly causes the header 24 to be restored to its lowered position. The console 44 further includes the usual reel lift lever 56, and a composite multi-purpose lever 60 having a control knob 62 associated therewith. Generally speaking, the lever 60, exclusive of the knob 62, is a combined speed and direction control lever which, when moved forwardly beyond a neutral position progressively imparts increased forward speed to the combine harvester. When the lever 60 is moved rearwardly beyond the neutral position it progressively imparts increased rearward speed to the harvester. In its neutral position, no power is applied to the harvester driving wheels. The lever 60 has its proximate end pivoted within the confines of the console 44 and it projects upwardly through a dogleg guide slot 64 which is formed in the top wall 66 of the console 44 and which presents a pair of laterally offset portions including a forward portion 68 and a rear portion 70, as well as a short laterally extending portion 72 which defines a stop shoulder 74 that serves to arrest sudden movement of the lever out of the forward portion 68 and into the rear portion 70. Movement of the lever 60 forwardly in the range established by the forward portion 68 serves to progressively increase the forward propulsion of the combine harvester, while movement of the lever 60 rearwardly in the range established by the rear portion 70 similarly serves to progressively increase the rearward propulsion of the harvester. When the lever 60 rests against the stop shoulder 74, or within the confines of the laterally extending portion 72, the harvester remains stationary.

Referring again to FIG. 1, it will be understood that the crop supply platform 22 may be provided at its leading edge with the usual transversely extending sickle assembly (not shown) and below the level of such assembly there is provided a sensing assembly including a plurality of ground-engaging feelers or fingers 80. These fingers 80 are operatively mounted on a transverse rock-shaft 82, from which they extend downwardly and rearwardly in such a manner that they cause oscillation of the rock-shaft in response to variations in the level of the terrain. The ground-engaging fingers 80 constitute the automatic control means whereby, as previously stated, the supply of fluid to the cylinder 28 may be automatically regulated for header raising and lowering operations, while the previously mentioned manual control means for the same purpose is represented by the header control lever 54 (FIG. 2).

The specific mechanism by means of which oscillation of the rock-shaft 82 under the control of the fingers 80 causes raising and lowering of the header 24 is only indirectly related to the present invention and therefore a detailed disclosure of such mechanism does not appear herein. One such means for translating the oscillatory motion of the fingers 80 into swinging movement of the header 24 is shown and described in U.S. Pat. No. 3,704,574, granted on Dec. 5, 1972 and entitled "Combine Automatic Header Height Control." For a full understanding of the nature and operation of the manner in which movement of the fingers 80 causes corresponding movement of the header 24, reference may be had to such patent but, in the present application, only such portions of this motion-translating means as are pertinent to the present invention have been illustrated herein, these portions consisting largely of the cylinder 28 and its plunger 32, as well as the fingers 80 themselves, these portions being described only in sufficient detail as to afford an understanding of their relation to the present invention. However, the entire disclosure of such patent, insofar as it is consistent with the present disclosure, is hereby incorporated in and made a part of this application by reference thereto. It is deemed sufficient for descriptive purposes herein to state that as the combine harvester moves forwardly with the various fingers 80 moving slidingly over the terrain, if a sudden rise in the level of the terrain is encountered, such fingers will ride upwardly and thus swing in a clockwise direction as viewed in FIG. 1. When this occurs, a corresponding clockwise motion of the rock-shaft 82 will operate through the media of a chain-and-drum mechanism to effect changes in the setting of a hydraulic control valve by means of which the flow of fluid to and from the header-elevating cylinder 28 is regulated, the regulation in the present instance being such that the plunger 32 will be projected so as to cause elevation of the header 24 by an extent commensurate with the change in ground elevation. Conversely, a change in the level of the terrain which results in a counterclockwise movement of the fingers 80 and rock-shaft 82 will effect a corresponding lowering of the header 24.

The arrangement of parts thus far described is more or less conventional and no claim is made herein to any novelty associated with the same, the novelty of the present invention residing rather in the means by which the operator of the combine harvester is precluded from inadvertently or otherwise manipulating the header control lever 54 in such a manner as to cause reverse or backward movement of the combine harvester when the header 24 is in its lowered ground-engaging position, it being obvious that such rearward movement might, especially in rough or soft terrain, rupture or otherwise damage one or more of the ground-engaging sensing fingers 80.

Referring now to FIGS. 2 to 5 inclusive, in order to prevent the operator of the combine harvester from moving the speed and direction control lever 60 which is associated with the console 44 into the rear portion 70 of the dogleg guide slot 64 except at such time as the header 24 is substantially in its fully raised position as indicated by the dotted lines in FIG. 1, a lockout solenoid 84 is fixedly clamped to the right side wall 86 (FIG. 2) of the console 44 and is provided with a lockout plunger 88 which normally assumes a projected position wherein it immediately underlies the top wall 66 of the console 44 as best shown in FIGS. 2 and 3 and bridges the distance between the shoulder 74 and the side wall 86, thus, in effect, blocking the entrance or mouth of the rear portion 70 of the dogleg slot 64 so that, in this extended or projected position of the plunger 88, the lever 64 may not enter such rear portion of the slot. As will be described in detail presently, the soleniod 84 is normally de-energized and upon energization thereof, the plunger 88 will become retracted to the dotted line position in which it is shown in FIG. 3, thus uncovering the entrance mouth to the rear portion 70 of the slot 64, thereby permitting entrance of the control lever 60 into such portion of the slot to effect reverse movement of the combine harvester.

According to the present invention, energization of the normally de-energized solenoid 84 is automatically effected at such time as the header 24 assumes its fully raised condition as shown in dotted lines in FIG. 1 so that, with the header thus raised, the operator may then manipulate the lever 60 and move the same into the rear portion 70 of the slot 64 to effect reverse travel of the combine harvester. At such time as the header 24 is moved an appreciable distance below its fully raised position, the solenoid 84 will automatically become de-energized and thereby restore the plunger 88 to its projected position and prevent movement of the lever 60 into the rear portion 70 of the slot 64.

Accordingly, and still referring to FIGS. 2 to 5 inclusive, the solenoid 84 is provided with a generally cylindrical stepped casing having a relatively large section 90 which encloses the solenoid winding W1, a reduced medial section 92 which affords a bearing for axial sliding movement of the plunger 88, and a further reduced section 94 which is exteriorly threaded and projects through an opening 96 which is formed in the side wall 88 of the console 44. A nut 98 and a cooperating washer 99 serve to clamp the annular shoulder which is established at the juncture region between the sections 88 and 90 against the outside face of the side wall 86 in the vicinity of the opening 92.

The plunger 88 is normally maintained in its projected position under the influence of a flexion spring 100, one end of which encircles an anchor pin 102 near the outer end of the plunger 88 and the other end of which is captured by the washer 96. The spring 100 is provided with a bight portion 104 which straddles a stabilizing bolt 106 carried by the top wall 66 of the console 44. The winding W1 of the solenoid 84 partially and slidingly receives the inner end region of the plunger 88 as shown in the circuit diagram of FIG. 5 and, upon energization of such winding W1, the plunger is caused to be retracted into the winding W1 against the action of the spring 100 as shown in dotted lines in FIG. 3, thereby uncovering the entrance mouth of the rear portion 70 of the slot 64 and permitting the operator to shift the lever 60 to its reverse drive position as previously set forth.

It has previously been set forth with reference to the aforementioned U.S. Pat. No. 3,704,574 that various swinging movements of the ground-engaging sensing fingers 80 (FIG. 1) will effect commensurate raising and lowering movements of the header 24. However, these relatively moderate up and down movements of the header which are a result of undulatory terrain are insufficient to effect energization of the solenoid 84. It is only when the header is fully raised that energization of the solenoid takes place. Accordingly, and as shown in FIGS. 1 and 5, a circuit making and breaking assembly 110 is operatively installed upon the harvester 10 and is effective between the fixed body portion 12 and the movable header 24 to close an electrical circuit through the solenoid 84 at such time as the header approaches its terminal "home" parked position as shown in dotted lines in FIG. 1, and to open such circuit at such time as the header swings downwardly away from such parked position.

Accordingly, an angle piece or bracket 112 (FIG. 5) is riveted or otherwise secured to an appropriate region on the right hand side of the operator's cab 38, while a similar angle piece or bracket 114 is similarly secured to an appropriate region on the header 24, preferably at a medial region a slight distance removed from the pivot shaft 26. Insofar as the circuit for the solenoid winding W1 is concerned, the angle piece or bracket 112 may be regarded as one contact element of a two-part separable contact "switch" the other contact element being in the form of a tubular contact sleeve 116 which is slidably received in telescopic fashion over a guide rod 118, the upper end region of which passes loosely through an opening 117 in the fixed angle piece 112 and the lower end of which is turned laterally as indicated at 120 and passes loosely through a hole or opening 122 which is formed in one leg of the angle piece 114. A cotter pin 124 captures the lower end of the rod 118 in the angle piece 114 while allowing swinging movement of the rod about the horizontal axis of the laterally turned end 120. The contact sleeve 116 is insulated from the rod 118 by means of an internal insulating sleeve 126. A helical cushioning spring 138 encompasses the lower region of the rod 118 and is supported on a washer 130 which encircles the rod and, in turn, is supported by a cotter pin 132 which passes through one of a series of vertically spaced holes 134 which are formed in the lower region of the rod 118. The upper end of the spring 138 yieldingly supports a washer 136 which is slidable on the rod 118 and which, in turn, serves to support the contact sleeve 116 and insulating sleeve 126. Stated otherwise, the contact and insulating sleeves 116 and 126 respectively are gravitationally supported on the washer 136, while the latter is gravitationally supported on the upper end of the spring 138. The vertically spaced holes 134 are adapted to selectively receive the cotter pin 132 in order to compensate for discrepancies in spring lengths.

From the above description, and with reference to FIGS. 1 and 5, it will be apparent that when the header 24 is in its lowered ground-engaging position as shown in full lines in FIG. 1, the contact sleeve 116 will be effectively supported by the spring 138 at a level below that of the fixed bracket or contact element 112. Upon manipulation of the header control lever 54 (FIG. 2) in such a manner as to effect raising of the header 24 (FIG. 1), the rod 118, and consequently the spring 138 and contact sleeve 116 will move bodily upwardly as a unit until such time as the sleeve 116 engages the fixed bracket or contact element 112, whereupon an electrical circuit for the solenoid 84 will be established in a manner that will be described in detail presently, thereby withdrawing the plunger 118 from the path of movement of the speed control lever 60. It is to be noted at this point that the top end of the contact sleeve 116 and its associated insulating sleeve 126 are recessed in frusto-conical fashion, thus establishing a circular line contact between the upper end of the sleeve 116 and the contact-forming bracket 112 to the end that good electrical contact between these two contact elements will at all times be assured, such circular line contact being such as to inhibit the entrapment of dirt or other foreign matter therebetween.

The operation of the herein described reverse drive lockout mechanism may readily be ascertained by reference to FIG. 5 when considered in conjunction with FIGS. 1 and 2. In accordance with conventional practice, substantially the entire electrical system which is associated with the combine harvester is predicted upon the fact that the chassis or body portion thereof constitutes an electrical ground to which the negative terminal of the battery B is connected. Upon turning of the ignition switch S (FIG. 5) to its "on" position, current is made available to the various electrical instrumentalities which are associated with the harvester, including the reverse drive lockout mechanism of the present invention. Assuming that the header 24 is in its raised parked position as shown in dotted lines in FIG. 1, the guide rod 118 which, as previously described, is carried by the header will assume an elevated position wherein the circular rim of the contact sleeve 116 is in electrical engagement with the contact bracket 112. In this raised position of the header and rod, a closed circuit will be established through the lockout solenoid 84, this circuit extending from the positive side of the battery B, through lead 11 (FIG. 5), ignition switch S, lead 13, winding W1 of the solenoid 84, leads 15, 17, contact sleeve 116, contact bracket or angle piece 112 (now in engagement with the sleeve 116), side wall of the operator's cab 38, leads 19, 21, chassis 12, and lead 23, back to the negative side of the battery B. Energization of the winding W1 of the solenoid 84 will serve to retract the plunger 88 so as to uncover the entrance mouth leading to the rear portion 70 of the dogleg slot 72 (FIG. 2) and thus permit the operator to shift the speed control lever 60 in the manner previously set forth so as to effect reverse movement of the harvester.

At such time as the header control lever 54 is shifted in such a manner as to cause lowering of the header 24 to its full line ground-sensing position as shown in full lines in FIG. 1, downward movement of the header will cause the guide rod 118 to also move downwardly, thus relieving the compression in the spring 138 and, at such time as the header closely approaches its ground-sensing position, the contact sleeve 116 will move away from the contact bracket or angle piece 112, thus discontinuing the circuit through the winding W1 of the solenoid 84, whereupon the solenoid will become deenergized and allow the spring 100 to force the plunger 88 to its fully projected position wherein the operator is unable to shift the lever 60 into the rear section 70 of the dogleg slot 64.

Under certain circumstances it may be desirable or necessary for the operator to effect limited reverse movement of the harvester 10 at a time when the header 24 is in its lowered ground-sensing position. For example, in a situation where an overhead structure such as the limb of a tree precludes the possibility of either further forward movement of the harvester or of raising the header 24 from the ground, conditions may be such that the situation can be relieved by inching the harvester rearwardly a small distance. Accordingly, means are provided whereby the operator may override the reverse speed lockout mechanism by manually depressing a push button PB which may be mounted at a convenient location on the side wall 86 of the console 44 (FIG. 2). Depression of the push button will establish an electric circuit which extends from the battery B (FIG. 5), through lead 11, ignition switch S, lead 13, winding W1 of the lockout solenoid 84, leads 15, 25, push button PB, leads 27, 21, framework or chassis 12, and lead 23 back to the battery. Energization of the winding W1 serves to effect retraction of the lockout plunger 88 in the manner previously described.

The invention is not to be limited to the exact arrangement of parts shown in the accompanying drawings or described in this specification as various changes in the details of construction may be resorted to without departing from the spirit of the invention. For example, although the present reverse speed lockout mechanism of the present invention has been set forth herein as being applicable to a console which embodies a dogleg slot such as the slot 92 which accommodates the fore and aft movements of a speed control lever of the type which is used with combine harvesters of the hydrostatic drive type, the lockout mechanism is equally applicable to a combine harvester of the belt drive type and which employs a shiftable transmission and a gear shift lever therefor which operates in a conventional H-slot, one leg of which represents a reverse speed drive. In such an instance, a solenoid such as the solenoid 84 will be appropriately mounted on the console so that in its extended position it precludes entry of the gear shift lever into the reverse drive portion of the slot. Additionally, although the present reverse drive lockout mechanism is predicated upon the use of a solenoid plunger 88 which is maintained in its projected position at such time as the solenoid 84 remains de-energized, it is contemplated that if desired, suitable modification of the circuitry involved may be resorted to so that the plunger becomes retracted when the solenoid is de-energized. In such an instance, suitable modification to the switch assembly 110 will be resorted to so that the contact elements thereof remain separated when the header 24 is in its raised position and move into electrical engagement with each other when the header is moved to its lowered ground-sensing position. Therefore, only insofar as the invention has particularly been pointed out in the accompanying claims is the same to be limited.

What is claimed is:

1. In a harvester of the type having a chassis, a crop-gathering header pivotally connected at its proximate end for swinging movement between a lower operative ground-scanning position and a raised inoperative position, hydraulic means for effecting movement of said header, a plurality of ground-sensing fingers on the distal end of said header and effective upon displacement thereof incident to their travel over the ground to control said hydraulic means, and a speed control lever operable in a forward speed range and a reverse speed range, the improvement which comprises a solenoid fixedly mounted on said chassis and having a plunger which is movable between a projected position wherein it is disposed in the path of movement of said lever and precludes entry thereof into said reverse speed range, and a retracted position wherein it is withdrawn from said path, an electric circuit for said solenoid, and contact means operatively disposed in said circuit and effective when the header closely approaches its lower ground-scanning position to actuate said solenoid and cause projection of said plunger, said contact means being effective when the header approaches its raised position to actuate the solenoid and cause retraction of said plunger.

2. A harvester as set forth in claim 1, wherein said contact means comprises a first contact element supported on said chassis, and a second contact element supported on the header and movable bodily therewith into and out of effective engagement with said first contact element.

3. A harvester as set forth in claim 2, wherein one of said contact elements is yieldably supported on its supporting member by a cushioning spring and the other contact element is fixedly mounted on its supporting member.

4. A harvester as set forth in claim 3, wherein said one contact element is yieldingly supported on the header and said other contact element is fixedly supported on the harvester chassis.

5. A harvester as set forth in claim 4, wherein spring means are provided for yieldingly biasing said solenoid plunger to its projected position, and said contact elements remain out of electrical engagement with each other when the header is in its lowered position and move into such engagement as the header approaches its raised position to thus energize the solenoid circuit and effect retraction of the plunger.

6. A harvester as set forth in claim 1, wherein spring means are provided for yieldingly biasing said solenoid plunger to its projected position, and said contact means comprises a guide rod pivoted at its lower end to a medial region of the header and movable bodily therewith, a first contact element in the form of a guide bracket fixedly secured to said chassis and through which the upper region of said guide rod loosely and slidingly projects, a helical cushioning spring loosely encircling said guide rod the supported at its lower end on a fixed region of the rod, a second and cooperating contact element in the form of a sleeve slidingly mounted on said guide rod and supported on the upper end of said spring, means electrically connecting said contact elements in the solenoid circuit whereby engagement therebetween will effect energization of the circuit and consequent retraction of said plunger, the effective length of said spring, and its disposition on the guide rod, being such that said contact elements remain out of engagement with each other when the header is in its lowered position and move into such engagement when the header approaches its raised position.

7. A harvester as set forth in claim 6, wherein means are provided for adjusting the vertical disposition of said spring on the guide rod to thus vary the distance between said contact elements when the header is in its lowered position.

8. A harvester as set forth in claim 6, wherein said guide bracket is electrically connected to the harvester chassis, an insulating sleeve is interposed between said contact sleeve and the guide rod, means are provided for electrically connecting said contact sleeve to one terminal of the solenoid, and means are provided for electrically connecting the other terminal of the solenoid to said chassis.

9. A harvester as set forth in claim 1 including, additionally, a manually operable switch disposed in the solenoid circuit and effective upon actuation thereof to override said contact means and thus cause retraction of said plunger.

10. A harvester as set forth in claim 6, wherein said electric circuit further includes a normally open manually operable push button switch effective when closed to energize said solenoid.

* * * * *